US008331781B2

(12) United States Patent
Nomura et al.

(10) Patent No.: US 8,331,781 B2
(45) Date of Patent: Dec. 11, 2012

(54) OPTICAL ACCESS NETWORK, REMOTE UNIT, OPTICAL COMMUNICATION METHOD, AND OPTICAL COMMUNICATION PROGRAM

(75) Inventors: Takumi Nomura, Tokyo (JP); Hiromi Ueda, Tokyo (JP); Takashi Kuriyama, Kanagawa (JP); Toshinori Tsuboi, Tokyo (JP); Hiroyuki Kasai, Tokyo (JP); Hirokazu Kobayashi, Kanagawa (JP)

(73) Assignee: NEC Communication Systems, Ltd., Tokyo (JP)

( * ) Notice: Subject to any disclaimer, the term of this patent is extended or adjusted under 35 U.S.C. 154(b) by 642 days.

(21) Appl. No.: 12/518,683

(22) PCT Filed: Dec. 27, 2007

(86) PCT No.: PCT/JP2007/075202

§ 371 (c)(1),
(2), (4) Date: Sep. 14, 2009

(87) PCT Pub. No.: WO2008/078819

PCT Pub. Date: Jul. 3, 2008

(65) Prior Publication Data

US 2011/0008043 A1 Jan. 13, 2011

(30) Foreign Application Priority Data

Dec. 27, 2006 (JP) ................................ 2006-353164

(51) Int. Cl.
*H04J 14/00* (2006.01)

(52) U.S. Cl. ............................... 398/51; 398/70; 398/66

(58) Field of Classification Search .................... 398/51, 398/70, 66

See application file for complete search history.

(56) References Cited

U.S. PATENT DOCUMENTS

| | | | | |
|---|---|---|---|---|
| 5,477,364 | A * | 12/1995 | Pearson | 398/54 |
| 2002/0027690 | A1 * | 3/2002 | Bartur et al. | 359/152 |

FOREIGN PATENT DOCUMENTS

| | | | |
|---|---|---|---|
| JP | 1998070509 | A | 3/1998 |
| JP | 1999127120 | A | 5/1999 |
| JP | 2003318865 | A | 11/2003 |
| JP | 2006140830 | A | 6/2006 |
| JP | 2006324796 | A | 11/2006 |

OTHER PUBLICATIONS

Chinese Office Action for CN200780048873.8 issued Aug. 26, 2011.

X. Jun et al., "Research of Receiving Equipment in Edge Node of OBS", Telecommunications Science, vol. 21, No. 9, 2005, pp. 13-15.

International Search Report for PCT/JP2007/075202 mailed Mar. 4, 2008.

802.3-2005—IEEE Std 802.3-2005 Part 3: Carrier sense multiple access with collision detection (CSMA/CD) access method and physical layer specifications, year 2005.

* cited by examiner

*Primary Examiner* — Danny Leung

(57) ABSTRACT

The present invention is to provide an optical access network in which a remote unit receives an optical burst signal. A central unit (OLT) transmits a DC-balanced optical continuous signal including packets having identification information for identifying each remote unit (ONU) to an optical switching module (OSM). The optical switching module (OSM) receives the DC-balanced optical continuous signal from the central unit (OLT), optically switches the packets based on the identification information, and transmits a DC-balanced optical burst signal including the packets to the remote unit (ONU). The remote unit (ONU) receives the DC-balanced optical burst signal and acquires the packets transmitted to the remote unit (ONU).

4 Claims, 13 Drawing Sheets

-- PRIOR ART --

-- PRIOR ART --

F I G. 5
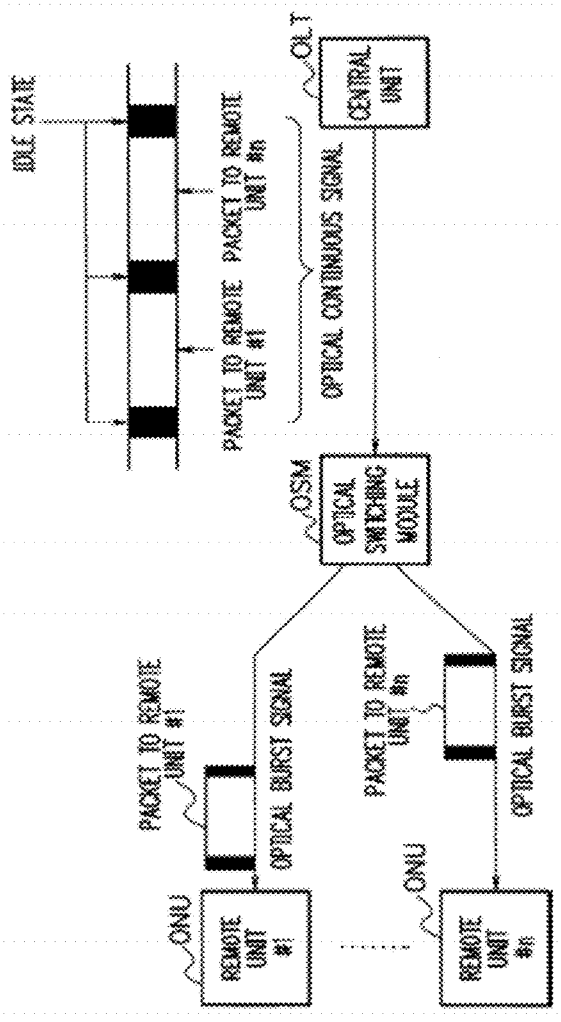

F I G. 7
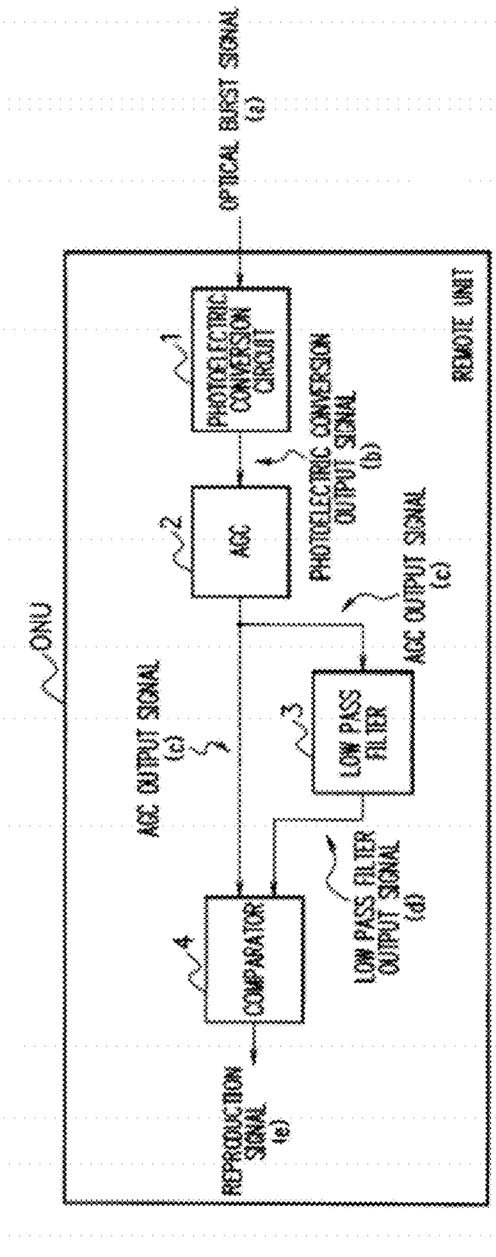

F I G. 8
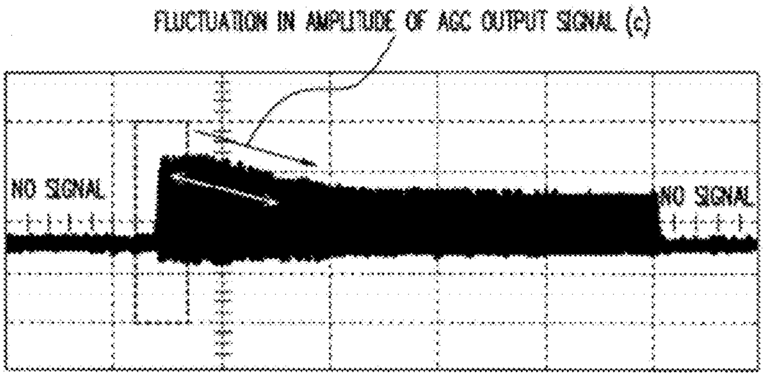

F I G. 11
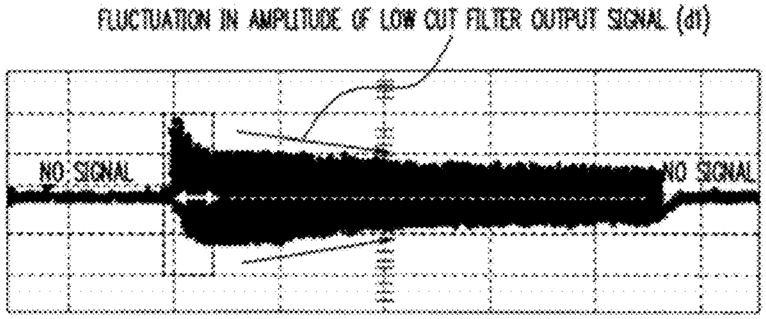

OPTICAL ACCESS NETWORK, REMOTE UNIT, OPTICAL COMMUNICATION METHOD, AND OPTICAL COMMUNICATION PROGRAM

TECHNICAL FIELD

The present invention relates to an optical access network, and more particularly, to an optical access network that controls an optical burst signal, a remote unit, an optical communication method, and an optical communication program.

BACKGROUND ART

For example, a GE-PON (Gigabit Ethernet-Passive Optical Network) defined by IEEE Std 802.3 (IEEE Standard for Information technology—Telecommunications and information exchange between systems-Local and metropolitan area networks—Specific requirements, Dec. 9, 2005) has been known as a technique related to an optical access network according to the present invention (for example, see Non-Patent Document 1).

The GE-PON disclosed in Non-Patent Document 1 transmits an IEEE802.3 frame (Ethernet frame) at a gigabit rate.

As shown in FIG. 1, the GE-PON includes a central unit (OLT': Optical Line Terminal), a plurality of remote units (ONU': Optical Network Unit), and an optical splitter (SP) provided therebetween.

In the GE-PON shown in FIG. 1, a downstream optical continuous signal transmitted from the central unit (OLT') is distributed to the remote units (ONU') by the optical splitter (SP). Then, each of the remote units (ONU') receives the downstream optical continuous signal distributed by the optical splitter (SP) all the time.

The inventors have proposed an optical access network before the present invention (for example, see Patent Document 1).

The optical access network disclosed in Patent Document 1 is referred to as a GE-OSAN (Gigabit Ethernet-Optical Switched Access Network).

As shown in FIG. 2, the GE-OSAN disclosed in Patent Document 1 includes a central unit (OLT'), remote units (ONU'), and an optical switching module (OSM') provided therebetween.

The optical switching module (OSM') uses a frame format defined by the IEEE802.3 standard to perform optical packet switching in the unit of gigabit Ethernet frames.

Therefore, each of the remote units (ONU') needs to receive an optical burst signal, which is an output signal of the optical switching module (OSM'), at a high speed.

For example, it is considered that each of the remote units (ONU') receives the optical burst signal using the technique used in the central unit (OLT') of the GE-PON shown in FIG. 1.

In the upstream communication of the GE-PON, a plurality of remote units (ONU') transmit data to one central unit (OLT'). Therefore, it is necessary to avoid the collision of upstream signals.

Therefore, the central unit (OLT') designates a transmission start time and a transmission duration time to each of the remote units (ONU') to avoid the collision of the upstream signals.

Accordingly, the upstream signal is an optical burst signal, and the central unit (OLT') includes a receiving circuit that receives the optical burst signal from each of the remote units (ONU').

The light intensity of the optical burst signal received by the central unit (OLT') depends on the transmission distance between the remote unit (ONU'), which is a source, and the central unit (OLT'). Therefore, when the transmission distances between the remote units (ONU') and the central unit (OLT') are different from each other, the light intensities of the optical burst signals received by the central unit (OLT') from the remote units (ONU'), which are sources, are different from each other.

Therefore, as shown in FIG. 3, the receiving circuit of the central unit (OLT') includes an ATC (Automatic Threshold Control). The ATC detects the maximum value of the light intensity of each signal, and sets half the detected maximum value as a threshold value.

In the IEEE802.3 standard, the ATC detects the maximum value of light intensity, and compensates the time required to determine the threshold value based on the detected maximum value. Therefore, a guard time of 400 nanoseconds is defined.

However, the optical burst signal received by the remote unit (ONU') of the GE-OSAN shown in FIG. 2 is different from the optical burst signal received by the central unit (OLT') of the GE-PON shown in FIG. 1 in physical conditions.

That is, there is an idle state, such as IFG (Inter-frame Gap), between the Ethernet frames in the frame format defined by the IEEE802.3 standard used in the GE-OSAN.

Therefore, the optical switching module (OSM') operates an optical switch during the IFG to perform optical packet switching while maintaining the Ethernet frame format.

However, the shortest time of the IFG is defined to 96 nanoseconds. If optical switching is performed at a middle point of the IFG, the guard time is about 48 nanoseconds, which is short. As a result, the receiving circuit including the ATC shown in FIG. 3 is likely not to satisfy the burst reception conditions of the remote unit (ONU') of the GE-OSAN.

Therefore, it is necessary to develop a receiving circuit capable of satisfying the burst reception conditions of the remote unit (ONU') of the GE-OSAN shown in FIG. 2.

In addition, as a related art of the present invention, an optical subscriber network has been proposed in which a space-division optical switch that switches optical signals during the same time slot is provided in a remote terminal (RT) provided between a line terminal apparatus (CT) of an exchange center and each subscriber network terminal apparatus (ONU) (for example, see Patent Document 2).

Further, a signal transmission system has been proposed in which a transmitting apparatus encodes each signal sequence such that a DC balance is obtained, adds an error-correcting code to the encoded signal, and outputs the signal to a receiving apparatus, and the receiving apparatus corrects the error of the signal sequence received from the transmitting apparatus and decodes each signal sequence that has been encoded such that a DC balance is obtained (for example, see Patent Document 3).

Patent Document 1: JP-A No. 2006-140830

Patent Document 2: JP-A No. 10-70509

Patent Document 3: JP-A No. 2003-318865

Non-Patent Document 1: IEEE Std 802.3, "IEEE Standard for Information technology—Telecommunications and information exchange between systems—Local and metropolitan area networks—Specific requirements", Dec. 9, 2005)

DISCLOSURE OF THE INVENTION

Problems to be Solved by the Invention

However, Non-Patent Document 1 and Patent Documents 2 and 3 do not disclose the reception of the optical burst signal by the remote unit (ONU) and necessities for the reception of the optical burst signal.

The present invention has been made in order to solve the above-mentioned problems, and an exemplary object of the present invention is to provide an optical access network in which a remote unit (ONU) receives an optical burst signal, a remote unit, an optical communication method, and an optical communication program.

Means for Solving the Problems

In order to achieve the exemplary object, the present invention has the following characteristics.

<Optical Access Network>

According to an exemplary aspect of the present invention, an optical access network includes: a central unit; a plurality of remote units; and at least one optical switching unit that is provided between the central unit and the remote units. The central unit includes means for transmitting an optical continuous signal including packets having identification information for identifying each of the remote units to the optical switching unit. The optical switching unit includes means for receiving the optical continuous signal, optically switching the packets based on the identification information, and transmitting an optical burst signal including the packets to the remote units. Each of the remote units includes means for receiving the optical burst signal and acquiring the packets transmitted to the remote unit. The central unit transmits a DC-balanced optical continuous signal. The optical switching unit receives the DC-balanced optical continuous signal, and performs the optical switching to transmit a DC-balanced optical burst signal. Each of the remote units receives the DC-balanced optical burst signal and acquires the packets.

<Remote Unit>

According to another exemplary aspect of the present invention, a remote unit that receives a signal output from an optical switching unit includes receiving means for receiving a DC-balanced optical burst signal including packets having identification information for identifying each remote unit and acquiring the packets transmitted to the remote unit.

<Optical Communication Method>

According to still another exemplary aspect of the present invention, there is provided an optical communication method performed in a remote unit that receives a signal output from an optical switching unit. The optical communication method includes a receiving step of allowing the remote unit to receive a DC-balanced optical burst signal including packets having identification information for identifying each remote unit and acquire the packets transmitted to the remote unit.

According to yet another exemplary aspect of the present invention, there is provided an optical communication method performed in an optical access network that includes a central unit, a plurality of remote units, and at least one optical switching unit provided between the central unit and the remote units. The central unit performs a step of transmitting an optical continuous signal including packets having identification information for identifying each of the remote units to the optical switching unit. The optical switching unit performs a step of receiving the optical continuous signal, optically switching the packets based on the identification information, and transmitting an optical burst signal including the packets to the remote units. Each of the remote units performs a step of receiving the optical burst signal and acquiring the packets transmitted to the remote unit. The central unit transmits a DC-balanced optical continuous signal. The optical switching unit receives the DC-balanced optical continuous signal, and performs the optical switching to transmit a DC-balanced optical burst signal. Each of the remote units receives the DC-balanced optical burst signal and acquires the packets.

<Optical Communication Program>

According to still yet another exemplary aspect of the present invention, there is provided an optical communication program for allowing a remote unit that receives a signal output from an optical switching unit to perform a step of receiving a DC-balanced optical burst signal including packets having identification information for identifying each remote unit and acquiring the packets transmitted to the remote unit.

Effects of the Invention

According to the present invention, a remote unit can receive an optical burst signal, and acquire packets transmitted to the remote unit.

BEST MODE FOR CARRYING OUT THE INVENTION

First, the outline of an optical access network according to an exemplary embodiment of the present invention will be described with reference to FIGS. 4 and 5.

As shown in FIG. 4, an optical access network according to this exemplary embodiment includes a central unit (OLT), a plurality of remote units (ONU), and at least one optical switching module (OSM) that is provided between the central unit (OLT) and the remote units (ONU).

As shown in FIG. 5, the central unit (OLT) transmits a DC-balanced optical continuous signal including packets having identification information for identifying each of the remote units (ONU) to the optical switching module (OSM).

The optical switching module (OSM) receives the DC-balanced optical continuous signal from the central unit (OLT), optically switches the packets based on the identification information, and outputs a DC-balanced optical burst signal including the packets to the remote units (ONU).

The remote unit (ONU) receives the DC-balanced optical burst signal from the optical switching module (OSM), and acquires the packets transmitted to the remote unit (ONU).

In this way, the remote unit (ONU) in the optical access network according to this exemplary embodiment can receive a DC-balanced optical burst signal, and acquire the packets transmitted to the remote unit (ONU). Hereinafter; the optical access network according to this exemplary embodiment will be described in detail with reference to the accompanying drawings.

First Exemplary Embodiment

System Structure of Optical Access Network

First, the system structure of an optical access network according to a first exemplary embodiment will be described with reference to FIG. 4. The optical access network shown in FIG. 4 is a GE-OSAN (Gigabit Ethernet-Optical Switched Access Network).

The optical access network according to this exemplary embodiment includes a central unit (OLT), an optical switching module (OSM), and remote units (ONU). In addition, the remote units (ONU) according to this exemplary embodiment are connected to the optical switching module (OSM) in a tree shape.

As shown in FIG. 5, the central unit (OLT) transmits a DC-balanced optical continuous signal including a packet signal in a downstream direction.

In addition, the central unit (OLT) according to this exemplary embodiment transmits a DC-balanced optical continuous signal including packets having identification information for identifying each of the remote units (ONU) to the optical switching module (OSM).

As shown in FIG. 5, the optical switching module (OSM) receives the DC-balanced optical continuous signal from the central unit (OLT), optically switches packet signals based on the identification information included in the received optical continuous signal, and outputs a DC-balanced optical burst signal including the packet signals to the remote units (ONU).

When receiving the DC-balanced optical continuous signal, the optical switching module (OSM) according to this exemplary embodiment performs optical switching within an idle time between packets and transmits the packet signal to an output port connected to the remote unit (ONU), which is a destination. In addition, the optical switching module (OSM) performs optical switching in the unit of packets to transmit the DC-balanced optical burst signal including the packet signal to the remote unit (ONU).

As shown in FIG. 5, the remote unit (ONU) receives the DC-balanced optical burst signal from the optical switching module (OSM), and acquires the packet signal transmitted to the remote unit (ONU).

As such, in the optical access network according to this exemplary embodiment, as shown in FIG. 5, the central unit (OLT) transmits the DC-balanced optical continuous signal to the optical switching module (OSM). Then, the optical switching module (OSM) receives the DC-balanced optical continuous signal from the central unit (OLT), and performs optical switching to transmit the DC-balanced optical burst signal to the remote units (ONU). Then, the remote unit (ONU) receives the DC-balanced optical burst signal from the optical switching module (OSM) at a high speed, and acquires packets transmitted to the remote unit (ONU) from the received optical burst signal.

The DC-balanced signal means a signal that is designed such that the frequencies of occurrence of 0 and 1 (a low level and a high level) are 50%:50% during the encoding of a digital signal.

The average value of the DC-balanced signal is an intermediate value between a low level potential and a high level potential. Therefore, the average value of the DC-balanced signal can be used as a reference potential for identifying a low level potential and a high level potential. In addition, a signal whose DC balance is broken has a non-uniform average potential. When the average value of the signal whose DC balance is broken is used as the reference potential, the accuracy of identifying a low level potential and a high level potential is lowered. Therefore, the optical access network according to this exemplary embodiment is constructed so as to transmit a DC-balanced signal.

An 8B/10B-encoded Ethernet signal can be used as the DC-balanced signal. In addition, an Ethernet frame can be applied to the packet signal.

As shown in FIG. 6, an IFG (Inter-Frame Gap) defined between the Ethernet frames may be used to perform optical switching, thereby transmitting a packet signal to an output port connected to the remote unit (ONU), which is a destination.

<Internal Structure of Remote Unit: ONU>

Next, the internal structure of the remote unit (ONU) according to this exemplary embodiment will be described with reference to FIG. 7.

The remote unit (ONU) according to this exemplary embodiment includes a photoelectric conversion circuit (1), an AGC (Automatic Gain Control) (2), a low pass filter (3), and a comparator (4).

The photoelectric conversion circuit (1) converts an optical burst signal (a) received by the remote unit (ONU) into an electric signal, and generates a photoelectric conversion output signal (b). For example, a PD (Photo Diode) can be used as the photoelectric conversion circuit (1).

When receiving the photoelectric conversion output signal (b), the AGC (2) amplifies the output level of the photoelectric conversion output signal (b) to a predetermined value and generates an AGC output signal (c).

For example, when a PD is used as the photoelectric conversion circuit (1), the AGC (2) amplifies the output level of the photoelectric conversion output signal (b) to a predetermined value and generates the AGC output signal (c) with a predetermined output level, since the output current (photoelectric conversion output signal) of the PD is very small.

The AGC (2) automatically adjusts a gain such that the AGC output signal (c) with a constant output level is obtained even when the amplitude of the photoelectric conversion output signal (b) varies. In general, the AGC (2) automatically adjusts the gain based on the average value of the photoelectric conversion output signal (b) received for a predetermined period of time. Therefore, when the AGC (2) receives the photoelectric conversion output signal (b) after a long non-signal period for which the photoelectric conversion output signal (b) is not received has elapsed, the gain of the AGC (2) is saturated, and then the amplitude of the AGC output signal (c) output from the AGC (2) is saturated. As a result, the output waveform of the AGC output signal (c) is distorted. FIG. 8 shows an example of the AGC output signal (c) generated by the AGC (2). FIG. 8 shows the AGC output signal (c) when the gain of the AGC (2) is saturated. The amplitude of the AGC output signal (c) varies as represented by an arrow '→' in FIG. 8. In FIG. 8, the time until a fluctuation of the amplitude of the AGC output signal (c) is stabilized (converged) depends on a time constant of the AGC (2).

The low pass filter (3) rejects a high-frequency component of the AGC output signal (c), and passes only a low-frequency component of the AGC output signal (c). Specifically, the low pass filter (3) rejects a component having a frequency that is higher than a specific threshold value in the AGC output signal (c), and passes only a low-frequency signal of the AGC output signal (c) as a low pass filter output signal (d). The threshold value may be arbitrarily changed. A reference potential for identifying the low-level potential and the high-level potential of the AGC output signal (c) is needed in order to determine the low level and the high level (logic level) of the AGC output signal (c) generated by the AGC (2). Therefore, in order to obtain the average value of the amplitude of the AGC output signal (c) used as the reference potential, the remote unit (ONU) according to this exemplary embodiment is provided with the low pass filter (3) and the low pass filter output signal (d) generated by the low pass filter (3) is input to the comparator (4), which will be described.

The comparator (4) compares the AGC output signal (c) with the low pass filter output signal (d), and generates a reproduction signal (e), which is the original signal. Specifically, the comparator (4) determines the low level and the high level of the AGC output signal (c) based on the low pass filter output signal (d), and generates the reproduction signal (e), which is the original signal.

Next, the control operation of the remote unit (ONU) according to this exemplary embodiment will be described with reference to FIGS. 7 to 9.

First, when receiving the optical burst signal (a), the photoelectric conversion circuit (1) converts the optical burst signal (a) into an electric signal, and generates the photoelectric conversion output signal (b). Then, the photoelectric conversion circuit (1) outputs the generated photoelectric conversion output signal (b) to the AGC (2).

When receiving the photoelectric conversion output signal (b), the AGC (2) amplifies the photoelectric conversion output signal (b) to a predetermined output level, and generates the AGC output signal (c) shown in FIG. 8. Then, the AGC (2) outputs the generated AGC output signal (c) to the comparator (4) and the low pass filter (3).

When receiving the AGC output signal (c), the low pass filter (3) rejects a high-frequency component of the AGC output signal (c), and generates the low pass filter output signal (d) shown in FIG. 9. Then, the low pass filter (3) outputs the generated low pass filter output signal (d) to the comparator (4). As shown in FIG. 9, the low pass filter output signal (d) has a level of 0 at the beginning, and the level of the low pass filter output signal (d) gradually approaches to the average value of the amplitude of the AGC output signal (c). Therefore, when the AGC output signal (c) generated by the AGC (2) passes through the low pass filter (3), it is possible to obtain the low pass filter output signal (d) having a level that is equal to the average value of the amplitude of the AGC output signal (c).

The comparator (4) compares the AGC output signal (c) obtained from the AGC (2) with the low pass filter output signal (d) obtained from the low pass filter (3), and generates the reproduction signal (e), which is the original signal.

As shown in FIG. 9, during an 'AGC transition period, the amplitude of the AGC output signal (c) obtained by the AGC (2) varies, and the low pass filter output signal (d) obtained from the low pass filter (3) has a potential that is equal to the average value of the high level and the low level of the amplitude of the AGC output signal (c) obtained from the AGC (2). Therefore, the comparator (4) determines the low level and the high level of the AGC output signal (c) based on the low pass filter output signal (d), and generates the reproduction signal (e), which is the original signal. Specifically, as shown in FIG. 9, during the period for which the level of the AGC output signal (c) is higher than that of the low pass filter output signal (d), the comparator (4) generates a high-level reproduction signal (e). During the period for which the level of the AGC output signal (c) is lower than that of the low pass filter output signal (d), the comparator (4) generates a low-level reproduction signal (e). In this way, the remote unit (ONU) according to this exemplary embodiment receives the optical burst signal (a) with the gain of the AGC (2) being saturated. Even when the amplitude of the AGC output signal (c) is saturated, the comparator (4) can determine the low level and the high level of the AGC output signal (c) and generate the original reproduction signal (e).

As such, as shown in FIG. 7, the remote unit (ONU) according to this exemplary embodiment can use a receiving circuit including the AGC (2) and the low pass filter (3). Therefore, it is possible to achieve a receiving circuit capable of satisfying the burst reception conditions of a remote unit (ONU'). When receiving a DC-balanced optical burst signal from the optical switching module (USM), the remote unit (ONU) according to this exemplary embodiment can acquire packets transmitted to the remote unit (ONU).

Further, the remote unit (ONU) according to this exemplary embodiment can use an inexpensive receiving circuit shown in FIG. 7, not a receiving circuit including an expensive ATC shown in FIG. 3, to acquire packets transmitted to the remote unit (ONU).

Second Exemplary Embodiment

Next, a second exemplary embodiment will be described.

In the first exemplary embodiment, as shown in FIG. 7, the remote unit (ONU) of the optical access network uses a receiving circuit including the AGC (2) and the low pass filter (3) to acquire packets transmitted to the remote unit (ONU).

The second exemplary embodiment is characterized in that, as shown in FIG. 10, a remote unit (ONU) of an optical access network uses a receiving circuit including an AGC (2), a first low cut filter (31), and a second low cut filter (32) to acquire packets transmitted to the remote unit (ONU).

In this way, similar to the first exemplary embodiment, the remote unit (ONU) according to this exemplary embodiment can use an inexpensive receiving circuit capable of satisfying the burst reception conditions of the remote unit (ONU') to acquire packets transmitted to the remote unit (ONU). Hereinafter, the optical access network according to the second exemplary embodiment will be described in detail with reference to FIGS. 11 to 13.

<System Structure of Optical Access Network>

The structure of the optical access network according to the second exemplary embodiment is similar to that of the optical access network according to the first exemplary embodiment shown in FIG. 4 except for the internal structure of the remote unit (ONU).

<Internal Structure of Remote Unit: ONU>

Next, the internal structure of the remote unit (ONU) according to this exemplary embodiment will be described with reference to FIG. 10.

As shown in FIG. 10, the remote unit (ONU) according to this exemplary embodiment includes the photoelectric conversion circuit (1), the AGC (2), the first low cut filter (31), the second low cut filter (32), and the comparator (4).

The photoelectric conversion circuit (1) converts an optical burst signal (a) received by the remote unit (ONU) into an electric signal, and generates a photoelectric conversion output signal (b).

When receiving the photoelectric conversion output signal (b), the AGC (2) amplifies the output level of the photoelectric conversion signal (b) to a predetermined value, and generates positive (+) and negative (−) AGC output signals (c).

The first low cut filter (31) removes a low-frequency component (=a DC component) from the positive (+) AGC output signal (c), and passes only a high-frequency component of the AGC output signal (c). Specifically, the first low cut filter (31) removes a frequency that is lower than a specific threshold value from the positive (+) AGC output signal (c), and passes only a high-frequency signal of the AGC output signal (c) as a positive (+) low cut filter output signal (d1). The threshold value may be arbitrarily changed.

The second low cut filter (32) removes a low-frequency component (=a DC component) from the negative (−) AGC output signal (c), and passes only a high-frequency component of the AGC output signal (c). Specifically, the second low cut filter (32) removes a frequency that is lower than a specific threshold value from the negative (−) AGC output signal (c), and passes only a high-frequency signal of the AGC output signal (c) as a negative (−) low cut filter output signal (d2). The threshold value may be arbitrarily changed.

As described above, the low cut filters (31, 32) remove a low-frequency component (=a DC component) from the AGC output signal (c), and pass only a high-frequency component of the AGC output signal (c), that is, only a frequency component of a net portion of a digital signal whose low and high levels vary. FIG. 11 shows an example of the low cut filter output signal (d1) generated by the first low cut filter (31) when a positive (+) AGC output signal (c) is input to the first low cut filter (31). Similar to the AGC output signal (c) shown in FIG. 8, the low cut filter output signal (d1) has variable amplitude. In FIG. 11, the time until a fluctuation of the amplitude of the low cut filter output signal (d1) is stabilized (converged) depends on a time constant of the first low cut filter (31), and the amplitude of the low cut filter output signal is changed to the same potential as that in a non-signal state after a time constant has elapsed from the reception of the AGC output signal (c).

The center value of the amplitude of each of the low cut filter output signals (d1, d2) is the bias potential of an input terminal of the comparator (4). In addition, the low cut filters (31, 32) have time constants, and it takes a predetermined amount of time for the amplitudes of the low cut filter output signals (d1, d2) to be stabilized (converged) to the intermediate level of the bias potential of the input terminal of the comparator (4). When the time constant of each of the low cut filters (31, 32) is set to a small value, the amplitudes of the low cut filter output signals (d1, d2) are rapidly stabilized (converged) to the bias potential. However, when the optical burst signal (a) received by the remote unit (ONU) does not have a DC balance, the center value of the amplitude of the low cut filter output signal (d) varies vertically. As a result, the reception characteristics of the remote unit (ONU) deteriorate. Therefore, when the time constant of each of the low cut filters (31, 32) is set to a small value, the remote unit (ONU) needs to receive a DC-balanced optical burst signal (a).

When the time constant of each of the low cut filters (31, 32) is set to a large value, it takes a long time for the amplitude of the low cut filter output signal (d) to be stabilized (converged) to the bias potential. During the period until the amplitude of the low cut filter output signal (d) is stabilized (converged) to the bias potential, it is difficult to compensate the normal reception of the remote unit (ONU). However, once the amplitude of the low cut filter output signal (d) is stabilized (converged) to the bias potential, the reception characteristics of the remote unit (ONU) are less likely to deteriorate even when the DC balance of the optical burst signal (a) is broken, since a response to the optical burst signal (a) is delayed.

The remote unit (ONU) according to this exemplary embodiment receives a DC-balanced optical burst signal (a). Therefore, even when the time constant of each of the low cut filters (31, 32) is set to a small value, the reception characteristics of the remote unit (ONU) do not deteriorate. Thus, when receiving the DC-balanced optical burst signal (a), the remote unit (ONU) according to this exemplary embodiment can acquire packets transmitted to the remote unit (ONU).

The comparator (4) compares the potential of the 'positive (+) low cut filter output signal (d1)' output from the first low cut filter (31) with the potential of the 'negative (−) low cut filter output signal (d2)' output from the second low cut filter (32), and generates the reproduction signal (e), which is the original signal, based on the difference between the potential of the positive (+) low cut filter output signal (d1) and the potential of the negative (−) low cut filter output signal (d2).

Next, the control operation of the remote unit (ONU) according to this exemplary embodiment will be described with reference to FIGS. 10 to 13.

First, when receiving the optical burst signal (a), the photoelectric conversion circuit (1) converts the optical burst signal into an electric signal, and generates the photoelectric conversion output signal (b). Then, the photoelectric conversion circuit (1) outputs the generated photoelectric conversion output signal (b) to the AGC (2). In FIG. 12, 'b1' indicates a positive logic (+) photoelectric conversion output signal, and 'b2' indicates a negative logic (−) photoelectric conversion output signal.

When receiving the photoelectric conversion output signal (b), the AGC (2) amplifies the photoelectric conversion output signal (b) to a predetermined output level, and generates the AGC output signal (c). Then, the AGC (2) outputs the generated AGC output signal (c) to the first low cut filter (31) and the second low cut filter (32).

In this exemplary embodiment, the AGC (2) outputs a positive (+) AGC output signal (c1) to the first low cut filter (31), and outputs a negative (−) AGC output signal (c2) to the second low cut filter (32).

In addition, in FIG. 12, 'c1' indicates the positive (+) AGC output signal, and 'c2' indicates the negative (−) AGC output signal.

When receiving the positive (+) AGC output signal (c1), the first low cut filter (31) rejects a low-frequency component of the positive (+) AGC output signal (c1), and generates a positive (+) low cut filter output signal (d1). Then, the first low cut filter (31) outputs the generated positive (+) low cut filter output signal (d1) to the comparator (4). As shown in FIG. 12, the positive (+) low cut filter output signal (d1) has a waveform that oscillates about the 'bias voltage of the input terminal of the comparator (4)' according to the time constant of the first low cut filter (31).

When receiving the negative (−) AGC output signal (c2), the second low cut filter (32) rejects a low-frequency component of the negative (−) AGC output signal (c2), and generates a negative (−) low cut filter output signal (d2). Then, the second low cut filter (32) outputs the generated negative (−) low cut filter output signal (d2) to the comparator (4). As shown in FIG. 12, the negative (−) low cut filter output signal (d2) has a waveform that oscillates about the 'bias voltage of the input terminal of the comparator (4)' according to the time constant of the second low cut filter (32).

In FIG. 12, 'd1' indicates the positive (+) low cut filter output signal, and 'd2' indicates the negative (−) low cut filter output signal.

The comparator (4) compares the potential of the positive (+) low cut filter output signal (d1) and the potential of the negative (−) low cut filter output signal (d2), and generates the reproduction signal (e), which is the original signal, based on the difference between the potential of the positive (+) low cut filter output signal (d1) and the potential of the negative (−) low cut filter output signal (d2).

In addition, as shown in FIG. 12, during a 'AGC transition period, the amplitude of the AGC output signal (c) varies, and the low cut filter output signals (d1, d2) have a waveform that oscillates about the 'bias voltage of the input terminal of the comparator (4)' according to the time constants of the low cut filters (31, 32), as shown in FIG. 12. In addition, the comparator (4) can determine the positive and negative logics without depending on a fluctuation of the amplitude of the AGC output signal (c) from the AGC (2).

For example, it is assumed that a bias potential difference shown in FIG. 13 is given. In FIG. 13, when the positive (+) low cut filter output signal (d1) is referred to as a positive (P)

signal and the negative (−) low cut filter output signal (d2) is referred to as a negative (N) signal, the comparator (4) compares the input potential of the positive (+) low cut filter output signal (d1) with the input potential of the negative (−) low cut filter output signal (d2). When the potential of the positive (+) low cut filter output signal (d1) is higher than that of the negative (−) low cut filter output signal (d2), the comparator generates a reproduction signal (e) at a high level (1). When the potential of the negative (−) low cut filter output signal (d2) is higher than that of the positive (+) low cut filter output signal (d1), the comparator (4) generates a reproduction signal (e) at a low level (0). When there is no signal, the comparator (4) generates a reproduction signal (e) at a low level (0) since the potential of the negative (−) low cut filter output signal (d2) is higher than that of the positive (+) low cut filter output signal (d1).

In the remote unit (ONU) according to this exemplary embodiment, the comparator (4) generates the reproduction signal (e), which is the original signal, based on the potential difference between the positive (+) low cut filter output signal (d1) and the negative (−) low cut filter output signal (d2). Therefore, it is possible to determine a logic level based on only the relative potential difference between the positive (+) low cut filter output signal (d1) and the negative (−) low cut filter output signal (d2), regardless of the amplitudes of the low cut filter output signals (d1, d2). Accordingly, even when there is a fluctuation of the amplitude of the AGC output signal (c), the operation of the comparator (4) is not affected. In this way, the remote unit (ONU) can acquire packets transmitted to the remote unit (ONU) from the DC-balanced optical burst signal received from the optical switching module (OSM).

As such, as shown in FIG. 10, the remote unit (ONU) according to this exemplary embodiment can use a receiving circuit including the AGC (2), the first low cut filter (31), and the second low cut filter (32). Therefore, it is possible to achieve a receiving circuit capable of satisfying the burst reception conditions of the remote unit (ONU'). When receiving a DC-balanced optical burst signal from the optical switching module (OSM), the remote unit (ONU) according to this exemplary embodiment can acquire'packets transmitted to the remote unit (ONU).

Further, the remote unit (ONU) according to this exemplary embodiment can use an inexpensive receiving circuit shown in FIG. 10, not a receiving circuit including an expensive ATC shown in FIG. 3, to acquire packets transmitted to the remote unit (ONU).

The above-described embodiments are exemplary embodiments of the present invention, but the present invention is not limited to the exemplary embodiments. Various modifications and changes of the present invention can be made without departing from the spirit and scope of the present invention.

For example, the system structure of the optical access network according to the above-described exemplary embodiments is not limited to the system structure shown in FIG. 4. However, the optical access network may have any system structure as long as it includes the central unit (OLT), the remote unit (ONU), and the optical switching module (OSM). In addition, a connection structure between the remote units (ONU) and the optical switching module (OSM) is not particularly limited. For example, the system structure disclosed in Patent Document 1 may be used.

Further, the control operation of each apparatus in the optical access network according to the above-described exemplary embodiments may be implemented by hardware, software, or a combination thereof.

When software is used to perform a process, a program having a process sequence recorded therein may be installed in a memory of a computer incorporated into dedicated hardware and then executed. Alternatively, a program may be installed in a general-purpose computer capable of performing various processes and then executed.

For example, a program may be recorded in a recording medium, such as a hard disk or a ROM (read only memory), in advance. Alternatively, a program may be temporarily or permanently stored (recorded) in a removal recording medium. Such a removal recording medium may be provided as so-called package software. Examples of the removal recording medium include a floppy (registered trademark) disk, a CD-ROM (compact disc read only memory), an MO (magneto-optical) disk, a DVD (digital versatile disc), a magnetic disk, and a semiconductor memory.

The program is installed from the removal recording medium to a computer. In addition, the program is wirelessly transmitted from a download site to the computer. Further, the program is transmitted to the computer through a network by wire.

The operation of the optical access network according to this exemplary embodiment may be performed in time series according to the processing operation of the above-described exemplary embodiments. In addition, the operation of the optical access network may be performed in parallel or individually according to the processing performance of a processing apparatus or if necessary.

This application is the National Phase of PCT/JP2007/075202, filed Dec. 27, 2007, which is based upon and claims the benefit of priority from Japanese patent application No. 2006-353164, filed on Dec. 27, 2006, the disclosure of which is incorporated herein in its entirety by reference.

INDUSTRIAL APPLICABILITY

The present invention can be applied to an optical access network that controls an optical burst signal.

BRIEF DESCRIPTION OF THE DRAWINGS

FIG. 5 is a first diagram illustrating an example of the control operation of the optical access network according to this exemplary embodiment.

FIG. 7 is a diagram illustrating an example of the internal structure of a remote unit (ONU) of the optical access network according to this exemplary embodiment.

FIG. 8 is a diagram illustrating an example of an AGC output signal (c).

FIG. 11 is a diagram illustrating an example of a low cut filter output signal (d).

REFERENCE NUMERALS

Figure 1:
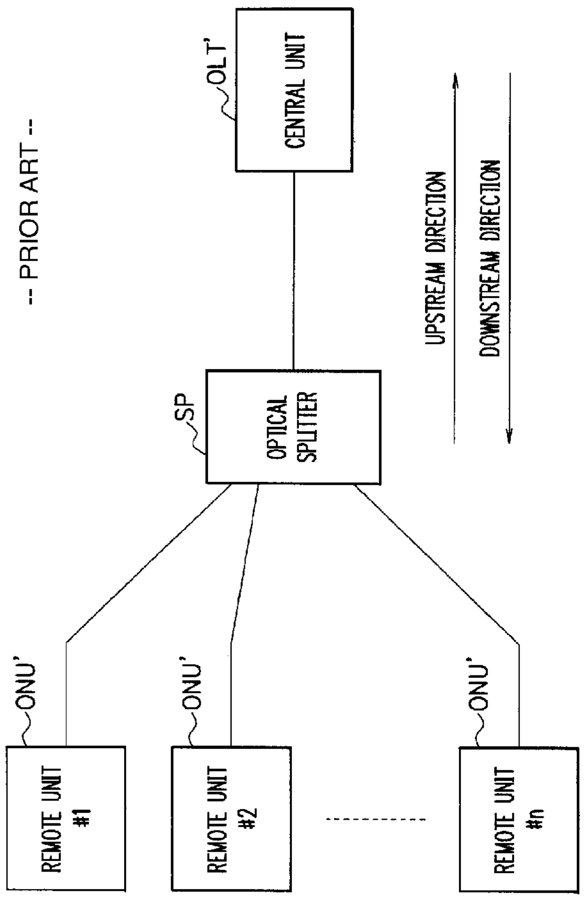
FIG. 1 is a diagram illustrating an example of the system structure of an optical access network related to the present invention, and shows the structure of a GE-PON.
Figure 2:
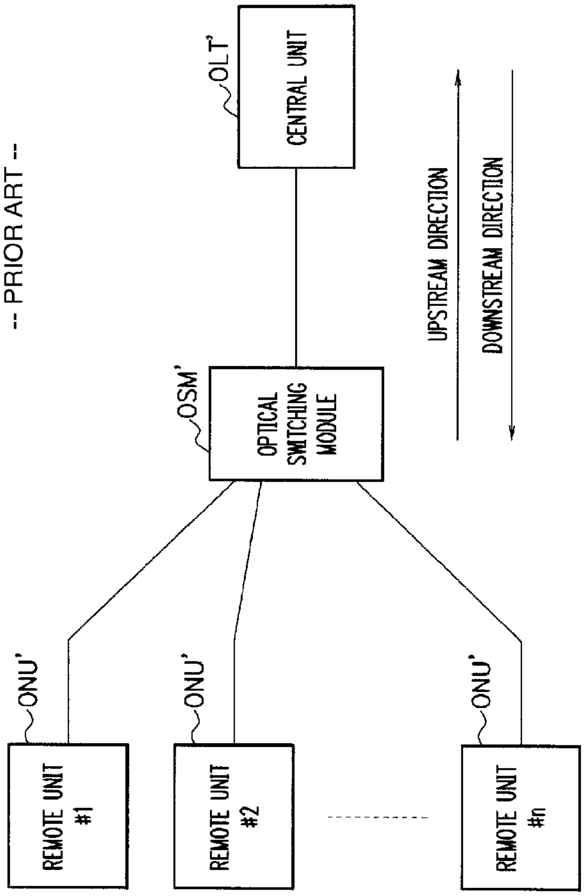
FIG. 2 is a diagram illustrating an example of the system structure of an optical access network related to the present invention, and shows the structure of a GE-OSAN.
Figure 3:
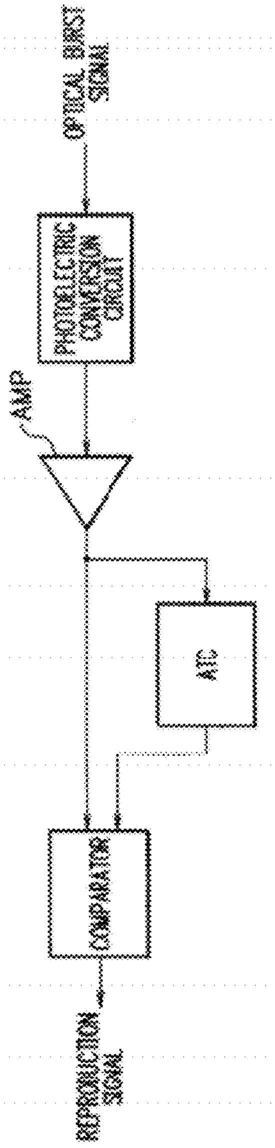
FIG. 3 is a diagram illustrating an example of the internal structure of a receiving circuit including an ATC.
Figure 4:
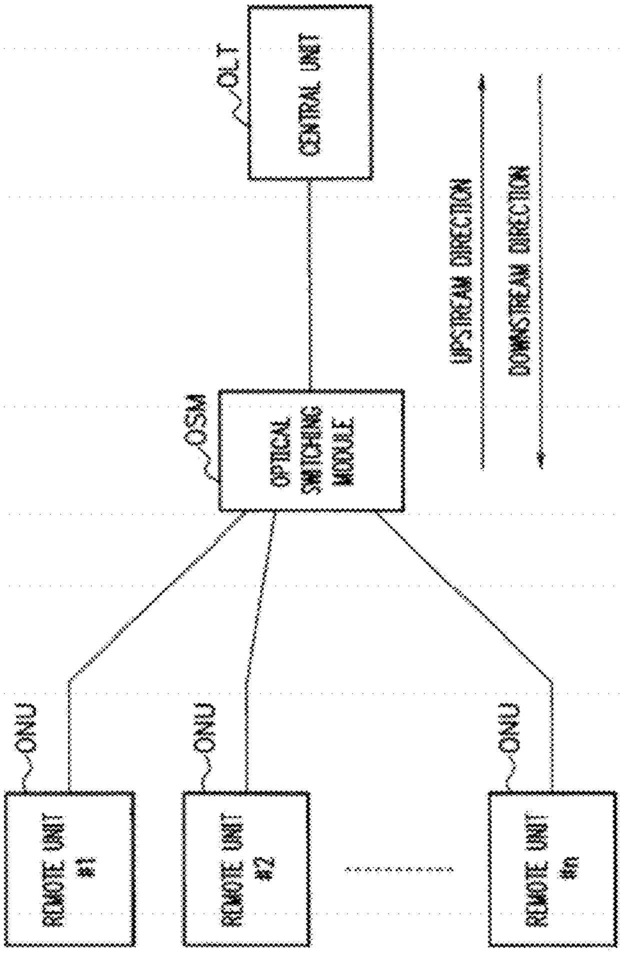
FIG. 4 is a diagram illustrating an example of the system structure of an optical access network according to an exemplary embodiment of the present invention, and shows the structure of a GE-OSAN.
Figure 6:
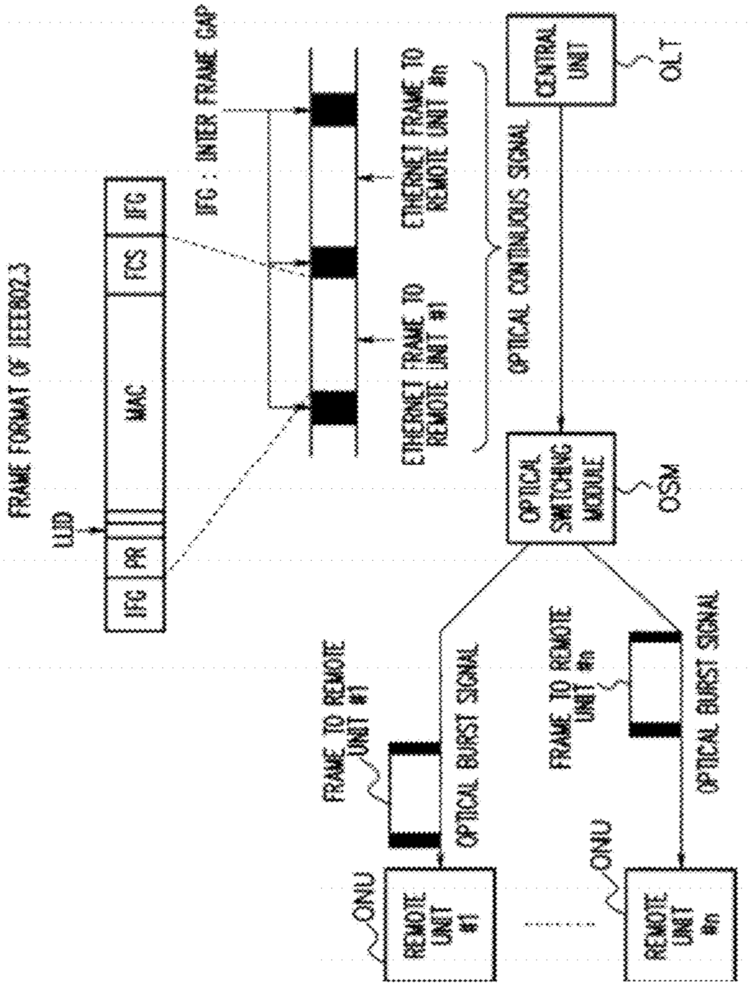
FIG. 6 is a second diagram according to an example of the control operation of the optical access network according to this exemplary embodiment.
Figure 9:
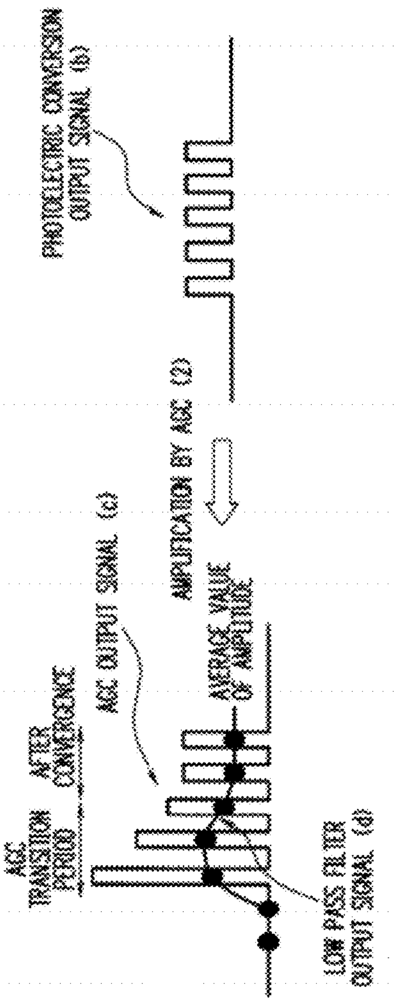
FIG. 9 is a diagram illustrating an example of the control operation of the remote unit (ONU) shown in FIG. 7.
Figure 10:
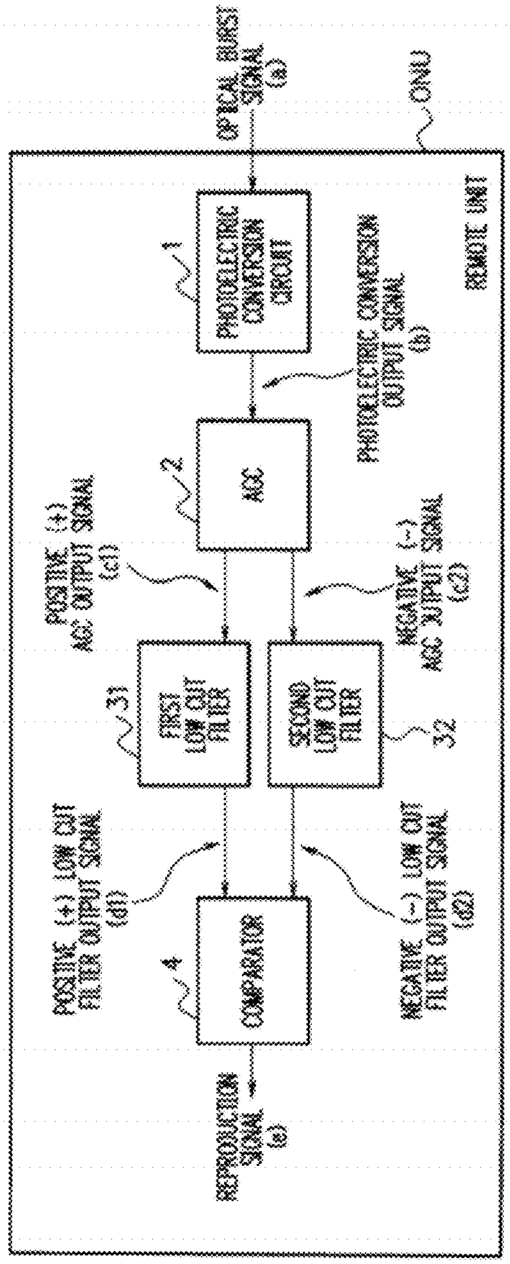
FIG. 10 is a diagram illustrating an example of the internal structure of a remote unit (ONU) of an optical access network according to a second exemplary embodiment.
Figure 12:
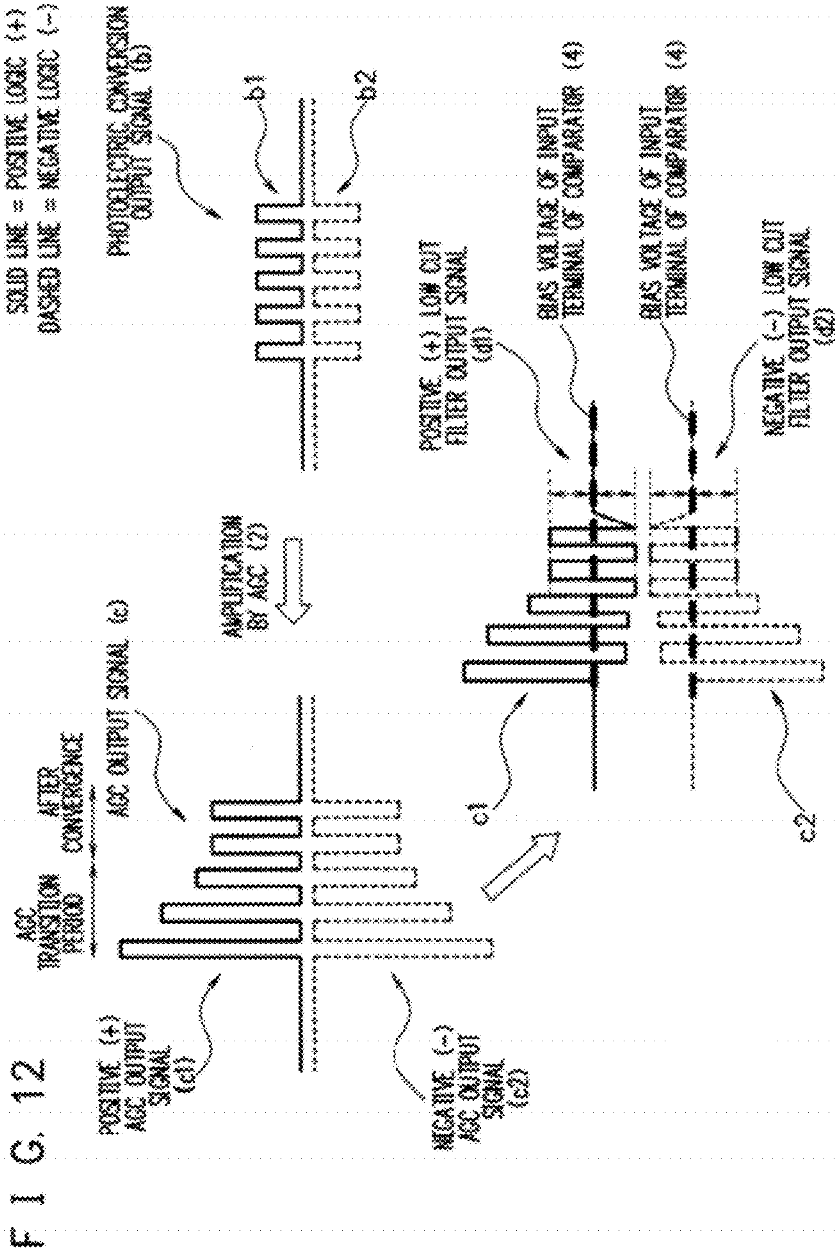
FIG. 12 is a diagram illustrating an example of the control operation of the remote unit (ONU) shown in FIG. 10.
Figure 13:
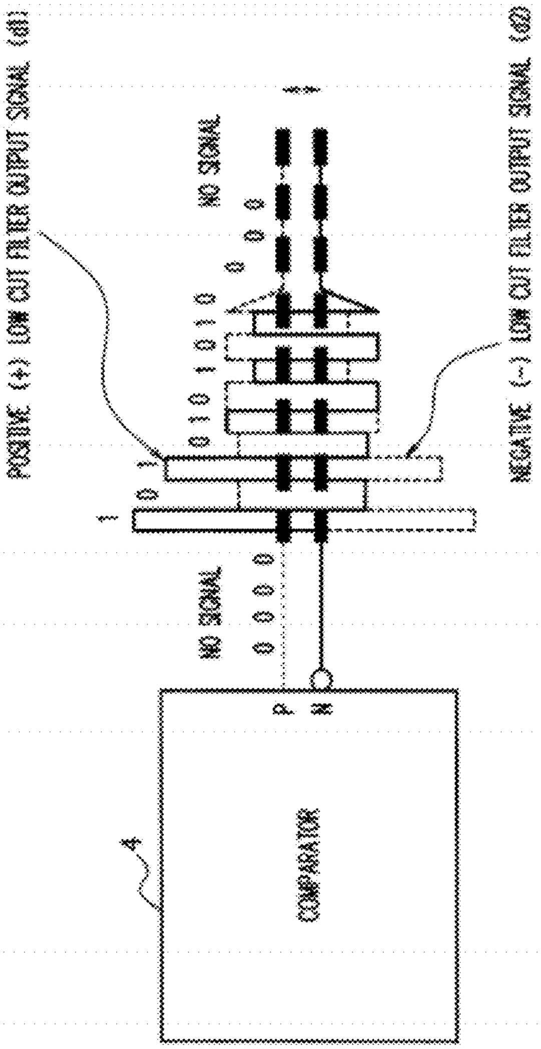
FIG. 13 is a diagram illustrating an example of the processing operation of a comparator (4) of the remote unit (ONU) shown in FIG. 10.

OLT: CENTRAL UNIT
OSM: OPTICAL SWITCHING MODULE
ONU: REMOTE UNIT
1: PHOTOELECTRIC CONVERSION CIRCUIT
2: AGC
3: LOW PASS FILTER
31: FIRST LOW CUT FILTER
32: SECOND LOW CUT FILTER
4: COMPARATOR

The invention claimed is:

1. An optical access network comprising:
a central unit;
a plurality of remote units; and
at least one optical switching unit that is provided between the central unit and the remote units,
wherein the central unit includes a part which transmits an optical continuous signal including packets having identification information for identifying each of the remote units to the optical switching unit,
the optical switching unit includes a part which receives the optical continuous signal, optically switches the packets based on the identification information, and transmits an optical burst signal including the packets to the remote units,
each of the remote units includes a part which receives the optical burst signal and acquires the packets transmitted to the remote unit,
the central unit transmits a DC-balanced optical continuous signal,
the optical switching unit receives the DC-balanced optical continuous signal, and performs the optical switching to transmit a DC-balanced optical burst signal, and
each of the remote units receives the DC-balanced optical burst signal and acquires the packets,
wherein each of the remote units includes:
a photoelectric conversion circuit that converts the optical burst signal into an electric signal;
an AGC that receives an output signal of the photoelectric conversion circuit and generates a signal having a constant output level;
a low pass filter that rejects a high-frequency component of an output signal of the AGC; and
a comparator that compares the output signal of the AGC with an output signal of the low pass filter and reproduces a signal, and
the remote unit acquires the packets.

2. An optical access network comprising:
a central unit;
a plurality of remote units; and
at least one optical switching unit that is provided between the central unit and the remote units,
wherein the central unit includes a part which transmits an optical continuous signal including packets having identification information for identifying each of the remote units to the optical switching unit,
the optical switching unit includes a part which receives the optical continuous signal, optically switches the packets based on the identification information, and transmits an optical burst signal including the packets to the remote units,
each of the remote units includes a part which receives the optical burst signal and acquires the packets transmitted to the remote unit,
the central unit transmits a DC-balanced optical continuous signal,
the optical switching unit receives the DC-balanced optical continuous signal, and performs the optical switching to transmit a DC-balanced optical burst signal, and
each of the remote units receives the DC-balanced optical burst signal and acquires the packets,
wherein each of the remote units includes:
a photoelectric conversion circuit that converts the optical burst signal into an electric signal;
an AGC that receives an output signal of the photoelectric conversion circuit and generates positive and negative signals having a constant output level;
a first low cut filter that rejects a low-frequency component of a positive output signal of the AGC;
a second low cut filter that rejects a low-frequency component of a negative output signal of the AGC; and
a comparator that compares an output signal of the first low cut filter with an output signal of the second low cut filter and reproduces a signal, and
the remote unit acquires the packets.

3. An optical communication method performed in an optical access network that includes a central unit, a plurality of remote units, and at least one optical switching unit provided between the central unit and the remote units, the optical communication method comprising:
performing, by the central unit, a step of transmitting an optical continuous signal including packets having identification information for identifying each of the remote units to the optical switching unit;
performing, by the at least one optical switching unit, steps of receiving the optical continuous signal, optically switching the packets based on the identification information, and transmitting an optical burst signal including the packets to the remote units;
performing, by each of the remote units, steps of receiving the optical burst signal and acquiring the packets transmitted to the remote unit;
performing, by the central unit, a step of transmitting a DC-balanced optical continuous signal;
performing, by the optical switching unit, steps of receiving the DC balanced optical continuous signal and performing the optical switching to transmit a DC-balanced optical burst signal;
performing, by each of the remote units, a step of receiving the DC-balanced optical burst signal and acquiring the packets;
performing, by each of the remote units, a step of converting the optical burst signal into an electric signal;
performing, by each of the remote units, steps of receiving the converted signal and generating a signal having a constant output level;
performing, by each of the remote units, a step of rejecting a high-frequency component of the signal having the constant output level to generate an additional signal; and performing, by each of the remote units, steps of comparing the signal having the constant output level with the additional signal, reproducing a signal, and acquiring the packets.

4. An optical communication method performed in an optical access network that includes a central unit, a plurality of remote units, and at least one optical switching unit provided between the central unit and the remote units, the optical communication method comprising:

performing, by the central unit, a step of transmitting an optical continuous signal including packets having identification information for identifying each of the remote units to the optical switching unit;

performing, by the at least one optical switching unit, steps of receiving the optical continuous signal, optically switching the packets based on the identification information, and transmitting an optical burst signal including the packets to the remote units;

performing, by each of the remote units, steps of receiving the optical burst signal and acquiring the packets transmitted to the remote unit;

performing, by the central unit, a step of transmitting a DC-balanced optical continuous signal;

performing, by the optical switching unit, steps of receiving the DC balanced optical continuous signal and performing the optical switching to transmit a DC-balanced optical burst signal;

performing, by each of the remote units, a step of receiving the DC-balanced optical burst signal and acquiring the packets;

performing, by each of the remote units, a step of converting the optical burst signal into an electric signal;

performing, by each of the remote units, a step of receiving the converted signal and generating positive and negative signals having a constant output level;

performing, by each of the remote units, a step of rejecting a low-frequency component of the positive signal to generate an additional positive signal;

performing, by each of the remote units, a step of rejecting a low-frequency component of the negative signal to generate an additional negative signal; and performing, by each of the remote units, steps of comparing the additional positive and negative signals, reproducing a signal, and acquiring the packets.

* * * * *